(No Model.)
L. L. TAPP.
DEVICE FOR GRINDING MOWER AND REAPER KNIVES.
No. 418,086. Patented Dec. 24, 1889.
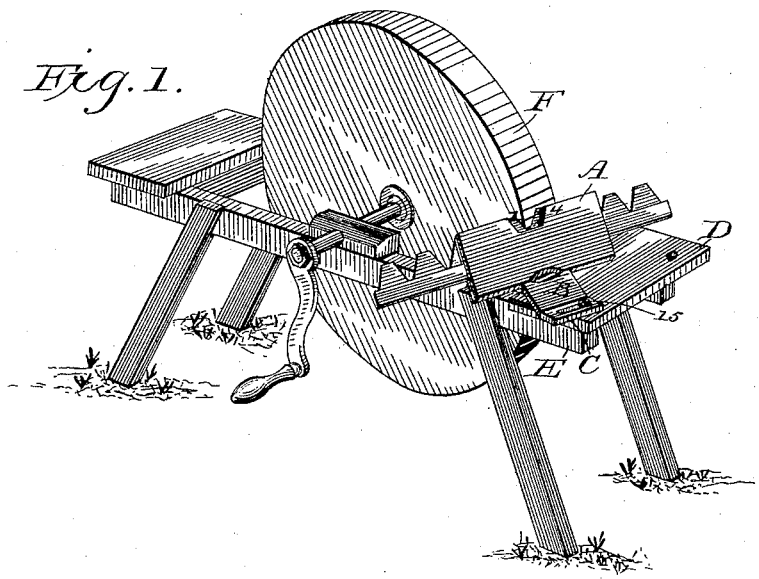
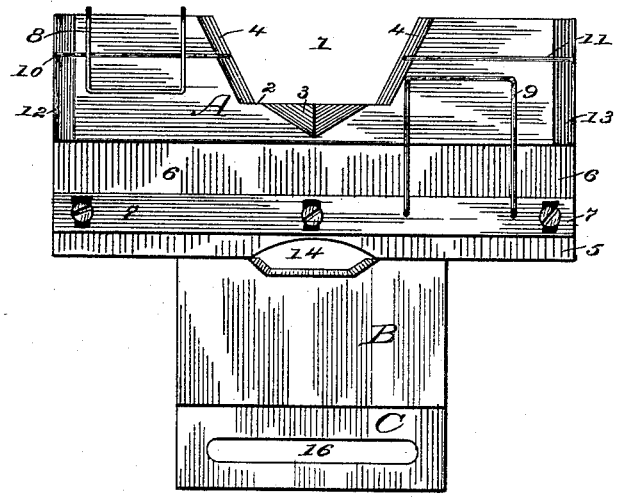
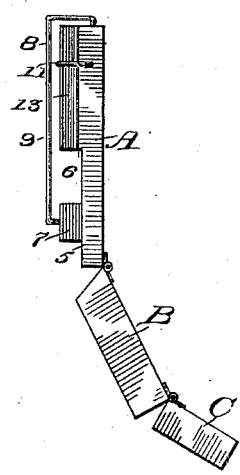
WITNESSES
Wm Musser
B. W. Sommers
INVENTOR
Lacy L. Tapp.
by A. G. Heysmun
Attorney

UNITED STATES PATENT OFFICE.

LACY L. TAPP, OF MADISONVILLE, KENTUCKY.

DEVICE FOR GRINDING MOWER AND REAPER KNIVES.

SPECIFICATION forming part of Letters Patent No. 418,086, dated December 24, 1889.

Application filed July 31, 1889. Serial No. 319,319. (No model.)

*To all whom it may concern:*

Be it known that I, LACY L. TAPP, a citizen of the United States of America, residing at Madisonville, in the county of Hopkins and State of Kentucky, have invented certain new and useful Improvements in Devices for Grinding Mower and Reaper Knives, of which the following is a specification.

The object of my invention is to provide improved means for holding and adjusting mower and reaper knives to a grindstone, so that one person can readily and conveniently operate the grindstone, and at the same time adjust the position of the knives to the stone and obtain the basil edge on all the blades or knives.

Reference being had to the accompanying drawings, wherein—

Figure 1 is a perspective view of the device as applied to the grindstone. Fig. 2 is a bottom plan view. Fig. 3 is a side view.

A designates the knife-rack, a portion of which is cut away at the center, forming an opening 1 with a back wall 2, in which is formed a center notch 3, to allow the edge of the blade to readily come in contact with the surface of the grindstone. The larger or outer opening 1 is beveled on its under surface, as indicated by 4, forming a continuation of the center notch 3. The bevel edges of the opening serve to prevent the edges of the knives from lodging against the same in moving the series in the knife-rack. A portion of the under and rear surface of the knife-rack is rabbeted, as at 5, which gives the knife a flat rest on the rack and permits the back of the knife to rest in a groove 6, formed by the bar 7, secured on the rabbet. This bar may be adjusted to fit different-sized blades by detaching and replacing it at other distances from the wall of the rabbet.

8 designates a holder and fender made of a substantial piece of wire of the form shown, and arranged and secured so that it will hold the knives on the knife-rack while being ground. At the opposite end of the knife-rack, and arranged in opposite direction to the fender 8, is a fender 9, secured to the bar 7, and extended over the groove formed by the bar and the wall of the rabbet, the object being to hold the bar of the knives in the groove and the knives on the rack.

Near the outer edge of the knife-rack A are bearing-wires 10 and 11, on which the knife rests, and prevent the sharp edges of the knife from cutting or wearing the surface of the rack, as would be the case if the knife rubbed against the wood. The outer edges of the rack are beveled, as at 12 and 13, to prevent the knife-edges from catching and cutting the rack as it is slid along, and to permit the movement of the knives freely by the operator.

B designates a plate hinged to the knife-rack A for the purpose of connecting it to the base-plate C. Between this plate B and the knife-rack A, I form an opening 14, to allow the hand to pass between the two plates to grasp the back of the knife in order to steady it while being ground. This base-plate is hinged to the plate B, and adjustably fastened to the bench D of the grindstone-frame E by means of a bolt 15 in the bench projecting through the slot 16 in the base-plate. By means of this slot and bolt the base-plate may be adjusted and secured to any desired position, thus enabling the operator to place the swinging frame at any desired angle to the grindstone F, mounted in the frame.

With my device any style of grindstone may be used, and any style of knife may be ground, and any desired bevel obtained. When one edge of the knife is ground, I loosen the bolt 14 and reverse the position of the rack. By this means I am enabled to obtain the same bevel to both sides of the knife.

Having thus described my invention, what I claim as new, and desire to secure by Letters Patent, is—

1. In combination, the base-plate C, the intermediate hinge-plate B and the knife-rack A, provided with the bevel opening 1, having the center notch 3, the adjustable bar 7, the oppositely-arranged fender-wires 8 9, the bearing-wires 10 11, and the beveled edges 12 13, substantially as described, and for the purpose specified.

2. In combination, the base-plate C, the intermediate hinge-plate B, and the knife-rack A, having the interposed hand-opening 14 between said plate and knife-rack, the bevel opening 1, having the center notch 3, the adjustable bar 7, the oppositely-arranged fender-wires 8 9, the bearing-wires 10 11, and the bevel edges 12 13, substantially as described, and for the purpose specified.

In witness whereof I have hereunto set my hand in the presence of two attesting witnesses.

LACY L. TAPP.

Attest:
JNO. T. ADAMS,
SAM. D. LANGLEY.